(12) United States Patent
Goto et al.

(10) Patent No.: US 6,365,657 B1
(45) Date of Patent: Apr. 2, 2002

(54) RUBBER PRODUCT

(75) Inventors: Hideo Goto; Makoto Nakamura, both of Kanagawa (JP)

(73) Assignee: Bridgestones Corporation, Tokyo (JP)

( * ) Notice: Subject to any disclaimer, the term of this patent is extended or adjusted under 35 U.S.C. 154(b) by 0 days.

(21) Appl. No.: 09/692,055

(22) Filed: Oct. 20, 2000

(30) Foreign Application Priority Data

Oct. 28, 1999 (JP) ............................. 11-306662

(51) Int. Cl.$^7$ ............................. C08K 5/13; C08L 9/00

(52) U.S. Cl. ................ 524/343; 524/275; 524/570; 524/571

(58) Field of Search ................ 524/343, 570, 524/571

(56) References Cited

U.S. PATENT DOCUMENTS

| | | | |
|---|---|---|---|
| 4,616,686 A | * | 10/1986 | Berta |
| 5,080,942 A | * | 1/1992 | Yau |
| 5,276,094 A | * | 1/1994 | Kaszas et al. |
| 5,753,290 A | * | 5/1998 | Adam |
| 5,801,332 A | * | 9/1998 | Berger et al. |

* cited by examiner

Primary Examiner—Tae H. Yoon
(74) Attorney, Agent, or Firm—Kanesaka & Takeuchi

(57) ABSTRACT

The rubber product has similar stretchability to the human skin, so that it is useful for application to items to be put into direct contact with the skin. The rubber product is provided with 200% modulus $M_{200}$ of equal to or less than 15 kgf/cm$^2$ ($14.7\times10^5$ Pa), and modulus ratios of 200% modulus $M_{200}$) to 100%. modulus ($M_{100}$) $M_{200}/M_{100}$, 300% modulus ($M_{300}$) to 200% modulus ($M_{200}$) $M_{300}/M_{200}$, and 400% modulus ($M_{400}$) to 300% modulus ($M_{300}$) $M_{400}/M_{300}$ all of which are equal to or less than 2.0.

12 Claims, 1 Drawing Sheet

RUBBER PRODUCT

FIELD OF THE INVENTION

The present invention relates to a rubber product which has similar steretchability to the human skin, so that it is suitable for applying to items to be put into contact with the human skin.

Rubber products to be applied to items being put into contact with the human skin, such as diapers, napkins, gloves, masks, and clothing including socks, underclothing and the like, are conventionally made up from natural rubber. The rubber products as above are required to be as follows.

i) The rubber product should have such steretchability similar to the human skin that the rubber product exhibits desirable adhesion properties and sealing properties without causing poor blood circulation. That is, the rubber product should be provided with such good rubber properties that the rubber product is expanded and contracted by a small force corresponding to expansion and contraction of the skin to keep its moderate tightness, and it springs back to the original form when the force is removed.

ii) The rubber product should have no allergenic ingredient, so that the rubber product prevents such problems as inflammation even when it is put into direct contact with the human skin.

iii) The rubber product should be excellent in stretchability and processability, and should have no temperature dependence. Furthermore, the rubber product should maintain its quality for a long time without being affected by the environment of usage thereof.

However, the rubber product having similar steretchability to the human skin has not been developed. Since conventional rubber product can not sufficiently follow up expansion and contraction of the human skin because of its large stretching stress, the rubber product might not sufficiently exhibit the adhesion properties and the sealing properties in some product designs. In the meantime, when the rubber product is too tight, it is unfit and inhospitable to a user, and, if too far, causes poor blood circulation.

JIS K637 specifies a standard of properties of a rubber thread wherein the thread has tensile strength of equal to or more than 150 kgf/cm$^2$ (1.47×10$^7$ Pa), extension of equal to or more than 60%, and elongation set of equal to or less than 13%, provided modulus at 300% is equal to or less than 25 kgf/cm$^2$ (2.45×10$^6$ Pa). The rubber thread of the standard cannot be provided with such good properties that it sufficiently follows up expansion and contraction of the human skin.

The conventional rubber product might cause inflammation when it is put into direct contact with the skin, because it is mainly composed of natural rubber which contains the allergenic ingredients protein). Therefore, the rubber product might be used with a cover made up from unwoven fabrics and the like, but in this case the covering material raises the processing cost of the rubber product and spoils the performance proper to the rubber.

While such elastic materials as thermoplastic elastomer (TPE) are provided as those materials which are applied to items to be put into direct contact with the skin, these materials are inferior in processability and setability, and have high temperature dependence, hence the materials cannot achieve steady stretching properties.

OBJECT AND SUMMARY OF THE INVENTION

It is an object of the present invention to overcome problems in the prior art described above and to provide a rubber product which has similar stretchability to that of the human skin, so that it is suitable for application to items to be put into contact with the human skin.

A rubber product of the present invention is provided with 200% modulus $M_{200}$ of equal to or less than 15 kgf/cm$^2$ (14.7×10$^5$ Pa), preferably of equal to or less than 10 kgf/cm$^2$ (9.8×10$^5$ Pa), and modulus ratios of 200% modulus ($M_{200}$) to 100% modulus ($M_{100}$) $M_{200}/M_{100}$, 300% modulus ($M_{300}$) to 200% modulus ($M_{200}$) $M_{300}/M_{200}$, and 400% modulus ($M_{400}$) to 300% modulus ($M_{300}$) $M_{400}/M_{300}$ all of which are equal to or less than 2.0, particularly equal to or less than 1.5.

The rubber product provided with such a low modulus and law modulus ratios, as $M_{200} \leq 15$ kgf/cm$^2$ (14.7×10$^5$ Pa), $M_{200}/M_{100} \leq 3.0$, $M_{300}/M_{200} \leq 3.0$ and $M_{400}/M_{300} \leq 2.0$ acquires the stretchability similar to that of the human skin.

The rubber product having such modulus as above is provided with tensile property as illustrated with the solid line in FIG. 1, and the rubber product having such tensile properties can acquire the stretchability exceptionally similar to that of the human skin. In FIG. 1, the broken line illustrates the tensile property of the conventional rubber thread used for the usual disposal diaper, and it shows that the rubber thread has stretchability seriously dissimilar from the human skin, so it is difficult to achieve enough adhesion properties and sealing properties without causing poor blood circulation by its too large tightness. The conventional rubber thread has 200% modulus $M_{200}$ of more than 15 kgf/cm$^2$ and the aforementioned modulus ratios of more than 2.0.

Since the rubber product of the present invention is easily deformed with a small load, it is required to have breaking extension of equal to or more than 600%, particularly of equal to or more than 800% from the viewpoint of the handling of the products. And the rubber product is preferable to have elongation set of equal to or less than 12% in order to maintain the sealing properties for a long time.

The rubber product of the present invention is preferable not to contain allergenic ingredients, that is, the rubber product is preferable to consist of synthetic rubber other than natural rubber, particularly of synthetic isoprene rubber (IR), more particularly IR containing equal to or more than 90% cis-1,4 links.

The rubber product of the present invention is preferable to have specific gravity of equal to or less than 1.06, particularly equal to or less than 1.0 in order to achieve a low modulus, low modulus ratios, and low elongation set.

From the viewpoint of security for durability, it is desirable that the rubber product is free from cracking even when it is held at extension of 20% for more than one month.

DETAILED DESCRIPTION OF THE PREFERRED EMBODIMENTS

Figure 1:
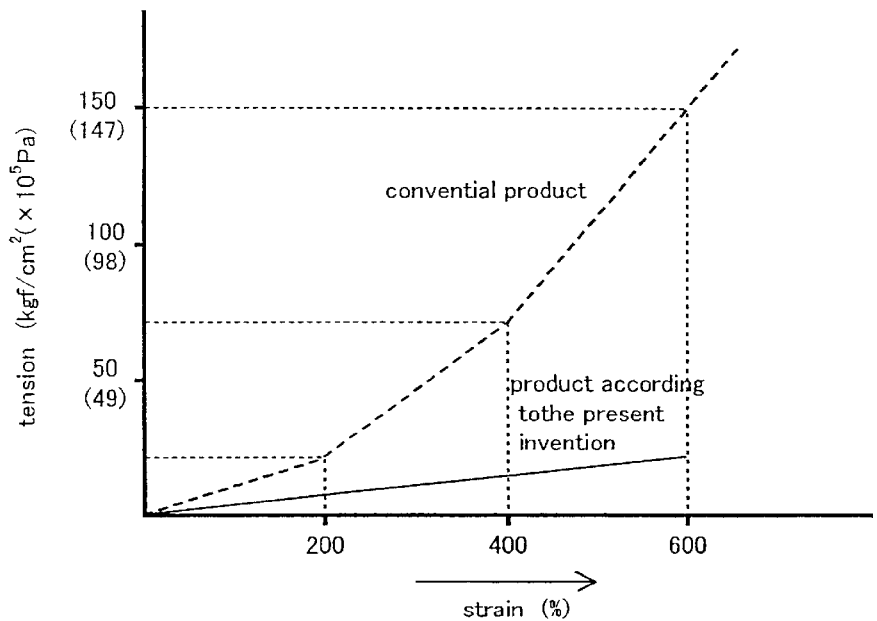
FIG. 1 is a graph showing the tensile properties of the rubber product of the present invention and the conventional one (a rubber thread used for the disposal diaper).
Figure 2:
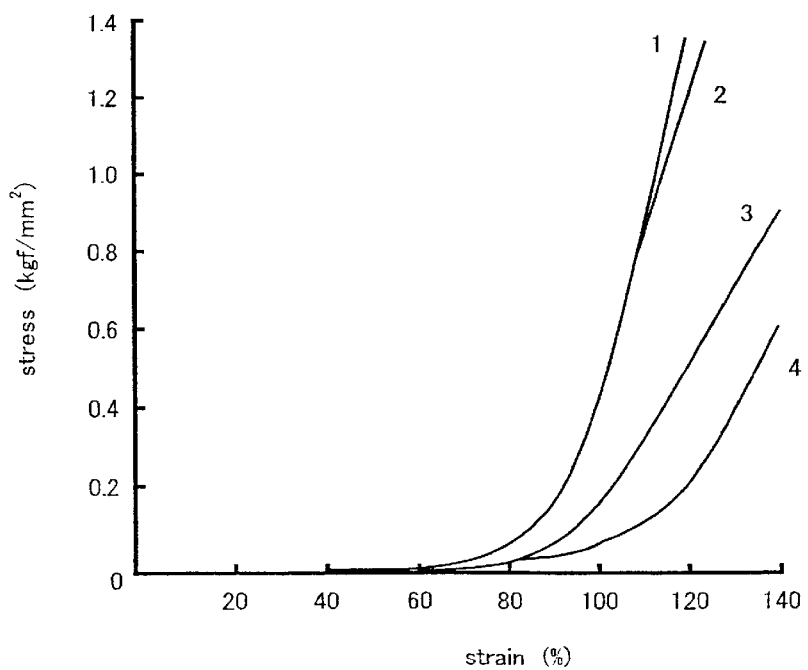
FIG. 2 is a graph showing stretchability (stress vs. strain curve) of each portion of the human skin.

Hereinafter, the rubber product of the present invention according to a preferable embodiment will be described.

A rubber product of the present invention has tensile properties provided with 200% modulus $M_{200} \leq 15$ kgf/cm$^2$ (14.7×10$^5$ Pa) and the following modulus ratios:

$M_{200}/M_{100} \leq 2.0$;

$M_{300}/M_{200} \leq 2.0$; and
$M_{400}/M_{300} \leq 2.0$,
and preferably has breaking extension of equal to or more than 600% and elongation set of equal to or less than 12%.

The rubber product having the above 200% modulus, modulus ratios and extension acquires stretchability exceptionally similar to that of the human skin.

In order to further closely imitate the human skin, the rubber product is preferable to have the 200% modulus $M_{200}$ of equal to or less than 10 kgf/cm² ($9.8 \times 10^5$ Pa), particularly in the range of 5 to 10 kgf/cm² ($4.9$–$9.8 \times 10^5$ Pa), and the modulus ratios $M_{200}/M_{100}$, $M_{300}/M_{200}$, $M_{400}/M_{200}$ of equal to or less than 1.5. Furthermore, the rubber product is especially preferable to have the breaking extension of equal to or more than 800% and the elongation set of equal to or less than 10%.

To avoid inflammation caused by allergenic reaction, the rubber product of the present invention preferably has rubber composition comprising 100% synthetic rubber, particularly 100% IR (isoprene rubber), completely without using natural rubber (NR) which contains allergenic protein. The rubber product comprising no NR causes no problem even when the rubber product is used in direct content with the human skin, and accordingly any covering material is useless, so that the rubber product of the present invention exhibits the proper good rubber property as following up the movement of the human skin.

In the present invention, IR is preferable to contain cis-1,4 links of equal to or more than 90%, particularly equal to or more than 96%. The more cis-1,4 links IR contains, the better properties the rubber product acquires.

The rubber product of the present invention achieves the aforementioned low modulus, low modulus ratios and low elongation set when the rubber product has the specific gravity of equal to or less than 1.06, particularly equal to or less than 1.0.

The rubber product of the present invention is useful for such items being put in contact with the human skin particularly as clothing. While the rubber product of the present invention does not require as high weatherability as those used in the outdoor environment, the rubber product is preferable to maintain its good condition without causing clacks even when it is held at extension of 20% in a room for more than one month.

To produce the rubber product having the aforementioned low modulus, low modulus ratios, high breaking extension, low elongation set, low specific gravity, high weatherability by using no NR but preferably IR, more preferably IR containing cis-1,4 links at high rate, it is preferable to compound an antioxidant into the rubber product. The antioxidant is preferable to be phenol series (phenolic antioxidant), polyphenol series, polyphenol series/benzoimidazole series, polyphenol series/wax, and polyphenol series/benzoimidazole series/wax, particularly polyphenol series/wax, or polyphenol series/benzoimidazole series/wax. The polyphenol series may be 2,2'-methylene-bis (4-ethyl-6-tert-butylphenol), 2-2'-methylene-bis (4-methyl-6-tert-butylphenol), 4,4,-butyliden-bis (3-methyl-6-tert-butylphenol), 4-4'-thiobis (3-methyl-6-tert-butylphenol), butylated product of dicyclopentadien and p-cresol, 2-5-di-tert-butylhydroquinone, and 2,5-di-tert-amylhydroquinone, preferably 2,2'-methylene-bis (4-ethyl-6-tert-butylphenole) or butylated product of dicyclopentadien and p-cresol, most preferably 2-2'-methylene-bis (4-ethyl-6-tert-butylphenole) or such butylated product of dicyclopentadiene and p-cresol respectively combined with 2-mercapto-benzoimidazole or 2-mercapto-methylbenzoimidazole. Furthermore, the antioxidant is preferable to be combined with those of hindered amine series or an ultraviolet absorbing agent.

While a composition containing a large amount of filler of natural rubber can easily provide relatively high weatherability, a composition containing a small amount of filler without natural rubber or carbon black is difficult to provide enough weatherability. Therefore, the rubber product of the present invention is preferable to contain at least one of the above antioxidants to improve the weatherability.

The content of the antioxidant(s) is determined by the aspects of scorch and its cost. The content is preferably from 0.1 to 3.0 parts by weight in total (including the ultraviolet absorbing agents if added) for the rubber of 100 parts by weight.

To produce a white rubber product, it is preferable to use rutile titanium oxide of a rutile type or the rutile type titanium oxide treated with aluminum as a white pigment. In this case, the amount of the pigment is preferably equal to or more than 5 parts by weight, particularly in the range of 5 to 10 parts by weight for the rubber of 100 parts by weight.

The rubber product may comprise a filler for reinforcing thereof. The filler may be silica, magnesium carbonate, active calcium carbonate or the like, and may be contained in an amount of less than 30 parts preferably less than 20 parts by weight for the rubber of 100 parts by weight.

To decrease the elongation set of the rubber product, the silica filler is preferable to have balking density of 90 to 130 g/liter, or exactly to be Nipsil ER having a balking density of 103 g/liter.

Sulfur is preferably added as a vulcanizing agent, and 2-mercaptobenzothiazole (M), dibenzothiazyl disulfide (DM), N-cyclohexyl-2-benzoimidazole sulfene amide (CZ), and N-tert-butyl-2-benzothiazolyl-sulfenamide (NS) may be added as a vulcanization accelerator. Sulfur is preferable to be contained in an amount of equal to or more than 1.0 part by weight, particularly in the range of 1.0 to 2.0 parts by weight, and the accelerator CZ is preferable to be contained in an amount of equal to or more than 0.4, particularly in the range of 0.4 to 0.8 parts by weight for the rubber composition of 100 parts by weight.

In the present invention, other plasticizing agents than above are preferable not to be contained.

The rubber product of the present invention can be produced by vulcanizing the aforementioned rubber composition at a temperature of 120 to 160° C. for about 30 to 90 minutes. Vulcanizing process by a vulcanizer is suitable to produce the rubber product of a long length.

The gauge of the rubber product of the present invention is preferably equal to or less than 1.0 mm, particularly equal to or less than 0.5 mm, so that the rubber product can sufficiently follow up the expansion and contraction of the human skin.

EXAMPLES AND COMPARATIVE EXAMPLES

Hereinafter, examples and comparative examples of the present invention will be described.

Examples 1 to 6 and Comparative Examples 1 to 9

Rubber compositions shown in Tables 1 and 2 are vulcanized and fabricated at a temperature of 130° C. for 40 minutes to prepare the rubber samples. It should be noted that each composition further contains stearic acid of 1.5 parts by weight and zinc white of 2.0 parts by weight. Each sample is examined by following process to measure its physical properties and quality, and the results are shown in Table 1 and 2.

[Measuring Method of the Moduli, Strength and Breaking Extension]

The tensile testing is made about each sample measuring 0.5 mm×1.0 mm×00 mm under condition where the distance between two gate marks is 10 mm, the stress rate is 100 mm/min and the distance between holding devices is 30 mm to measure moduli ($M_{100}$, $M_{200}$, $M_{300}$, $M_{400}$), strength and breaking extension.

[Measuring Method of the Elongation Set]

Three samples measuring 0.5 mm×1.0 mm×100 mm are held under a condition where the distance of two gate marks is 40 mm, the room temperature is 50° C. and the rate of extension is 100% for 24 hour to determine the elongation set.

[Measuring Method of the Allergenicity]

Samples having no natural rubber are denoted by a round sign "○" and samples including natural rubber are denoted by a cross sign "X" in Tables 1 and 2.

[Measuring Method of the Processability]

Workability of calendering process is estimated visually about each sample. Samples which are viewed very good workability are denoted by a round sign "○", samples which exhibit not too bad workability are denoted by triangle sign "Δ", and samples which exhibit worse workability are denoted by a cross sign "X" in Tables 1 and 2.

[Measuring Method of the Weatherability]

Held at an extension of 20% for more than one month, samples which are not cracked are denoted by round sign "○" and samples which are cracked are denoted by a cross sign "X" in Tables 1 and 2.

In Tables 1 and 2, the signs *1 to *8 respectively denote the followings.

*1 $IR_{2000}$: IR containing 98% cis-1,4 links

*2 CarifLex®: IR containing 91% cis-1,4 links

*3 Nipsil® $VN_3$: bulking gravity 145 g/L

*4 Nipsil ER: bulking gravity 103 g/L

*5 Nocrack® SP: metylbenzyl phenol

*6 Nocrack NS-5: 2,2'-methylene-bis (4-ethyl-6-tert-butylphenole)

*7 Nocrack NS-30: 4,4'-buthylidene-bis (3-methyl-6-tert-butylphenole)

*8 Nocrack PBK: butylated product dicyclopentadien and p-cresol

Cariflex® is available from Shell Chemicals.
Nipsil® is available from Nipponsilica Industrial.
Nocrack® is available from Ouchishinko Chemical Industrial.

Table 1 shows that the rubber product of the present invention has such good steretchability that it can closely follow expansion and contraction of the human skin, and it is provided with good processabilty, setability and weatherability, so that the rubber product of the present invention is excessively useful for applying to items to be put into contact with the human skin.

TABLE 1

|  |  |  | Examples | | | | | |
|---|---|---|---|---|---|---|---|---|
|  |  |  | 1 | 2 | 3 | 4 | 5 | 6 |
| composition of rubber (weight part) | rubber | NR |  |  |  |  |  |  |
|  |  | IR2200 * 1 | 100 | 100 | 100 | 100 | 100 | 100 |
|  |  | CARIFLEX * 2 |  |  |  |  |  |  |
|  | filler | titanium oxide | 5 | 5 | 5 | 5 | 5 | 5 |
|  |  | silica VN3 * 3 |  |  |  |  |  |  |
|  |  | silica ER * 4 |  |  |  |  | 15 |  |
|  |  | white lead CC |  |  |  | 15 |  |  |
|  |  | magnesium carbonate |  |  |  |  |  | 15 |
|  | antioxident | SP * 5 |  |  |  |  |  |  |
|  |  | NS-5 * 6 | 1 |  |  |  |  | 1 |
|  |  | NS-30 * 7 |  |  |  |  |  |  |
|  |  | PBK * 8 |  | 1 | 1 |  |  | 1 |
|  |  | thiourea |  |  |  |  |  |  |
|  |  | wax | 1 | 1 | 1 | 1 | 1 | 1 |
|  | sulfer |  | 1.5 | 1.5 | 1.5 | 1.5 | 1.5 | 1.5 |
|  | accelerator CZ |  | 0.5 | 0.5 | 0.5 | 0.5 | 0.5 |  |
|  | accelerator NS |  |  |  |  |  |  | 0.8 |
| $M_{100}$ (kgf/cm²) |  |  | 5.4 | 4.8 | 7.5 | 7.4 | 6.2 | 4.6 |
| $M_{200}$ (kgf/cm²) |  |  | 7.9 | 6.5 | 11.0 | 10.7 | 8.9 | 6.5 |
| $M_{300}$ (kgf/cm²) |  |  | 10.0 | 9.6 | 15.0 | 14.8 | 11.7 | 9.3 |
| $M_{400}$ (kgf/cm²) |  |  | 13.6 | 12.0 | 27.4 | 25.2 | 20.8 | 11.7 |
| $M_{200}/M_{100}$ |  |  | 1.5 | 1.4 | 1.5 | 1.4 | 1.4 | 1.4 |
| $M_{300}/M_{200}$ |  |  | 1.3 | 1.5 | 1.4 | 1.4 | 1.3 | 1.4 |
| $M_{400}/M_{300}$ |  |  | 1.4 | 1.3 | 1.8 | 1.7 | 1.8 | 1.3 |
| elongation at break (%) |  |  | 840 | 970 | 820 | 800 | 800 | 950 |
| tensil strength at break (kg/cm²) |  |  | 127 | 93 | 175 | 162 | 169 | 103 |
| elongation set (%) |  |  | 3.3 | 3.2 | 5.3 | 7.5 | 5.0 | 3.5 |
| spesific gravity |  |  | 0.98 | 0.98 | 1.05 | 1.04 | 1.05 | 0.98 |
| wethering propeties |  |  | ○ | ○ | ○ | ○ | ○ | ○ |
| processability |  |  | ○ | ○ | ○ | ○ | ○ | ○ |
| allergenicity |  |  | ○ | ○ | ○ | ○ | ○ | ○ |

TABLE 2

|  |  |  | Comparative examples | | | | | | | |
|---|---|---|---|---|---|---|---|---|---|---|
|  |  |  | 1 | 2 | 3 | 4 | 5 | 6 | 7 | 8 |
| composition of rubber (weight part) | rubber | NR | 70 | 70 |  |  |  |  |  |  |
|  |  | IR2200 * 1 | 30 | 30 | 100 | 100 | 100 | 100 | 30 | 70 |
|  |  | CARIFLEX * 2 |  |  |  |  |  |  | 70 | 30 |
|  | filler | titanium oxide | 5 | 5 | 5 | 5 | 5 |  |  |  |
|  |  | silica VN3 * 3 |  |  |  |  |  | 15 |  |  |
|  |  | silica ER * 4 |  |  |  |  |  |  |  |  |
|  |  | white lead CC |  |  |  |  |  |  |  |  |
|  |  | magnesium carbonate |  | 30 |  |  |  |  |  |  |
|  | antioxident | SP * 5 |  |  |  |  | 1 |  |  |  |
|  |  | NS-5 * 6 |  |  |  |  |  | 1 |  |  |
|  |  | NS-30 * 7 |  |  |  | 1 |  |  | 1 | 1 |
|  |  | PBK * 8 |  |  |  |  |  |  |  |  |
|  |  | thiourea | 1 | 1 | 1 |  |  |  | 1 | 1 |
|  |  | wax | 1 | 1 | 1 | 1 | 1 | 1 | 1 | 1 |
|  | sulfer |  | 1.0 | 1.0 | 1.0 | 1.5 | 1.5 | 1.5 | 1.5 | 1.5 |
|  | accelerator CZ |  | 0.5 | 0.5 | 0.5 | 0.5 | 0.5 | 0.5 | 0.5 | 0.5 |
| $M_{100}$ (kgf/cm$^2$) |  |  | 4.6 | 9.3 | 3.2 | 5.8 | 5.0 | 6.0 | 5.6 | 5.1 |
| $M_{200}$ (kgf/cm$^2$) |  |  | 6.3 | 22.4 | 4.3 | 7.4 | 6.8 | 8.0 | 7.4 | 7.7 |
| $M_{300}$ (kgf/cm$^2$) |  |  | 8.0 | 38.5 | 6.0 | 10.8 | 11.0 | 10.2 | 9.9 | 13.5 |
| $M_{400}$ (kgf/cm$^2$) |  |  | 11.3 | 81.9 | 7.2 | 13.9 | 15.2 | 12.2 | 10.7 | 16.3 |
| $M_{200}/M_{100}$ |  |  | 1.3 | 2.4 | 1.3 | 1.3 | 1.4 | 1.3 | 1.3 | 1.5 |
| $M_{300}/M_{200}$ |  |  | 1.4 | 1.7 | 1.4 | 1.5 | 1.6 | 1.3 | 1.2 | 1.8 |
| $M_{400}/M_{300}$ |  |  | 1.4 | 2.1 | 1.2 | 1.3 | 1.4 | 1.2 | 1.1 | 1.2 |
| elongation at break (%) |  |  | 1080 | 580 | 1140 | 930 | 1020 | 870 | 810 | 940 |
| tensil strength at break (kg/cm$^2$) |  |  | 121 | 183 | 101 | 118 | 103 | 145 | 122 | 109 |
| elongation set (%) |  |  | 3.2 | 3.5 | 3.6 | 3.3 | 3.5 | 13.0 | 4.5 | 4.0 |
| spesific gravity |  |  | 0.99 | 1.12 | 0.98 | 0.98 | 0.98 | 1.04 | 0.98 | 0.98 |
| wethering propeties |  |  | ○ | ○ | x | x | x | ○ | x | ○ |
| processability |  |  | ○ | ○ | ○ | ○ | ○ | ○ | x | Δ |
| allergenicity |  |  | x | x | ○ | ○ | ○ | ○ | ○ | ○ |

As described above, according to the present invention, the rubber product which has such steretchability similar to the human skin that the rubber product is useful for application to items to be put into direct contact with the human skin is provided.

The rubber product of the present invention is capable of following up expansion and contraction of the skin closely, so that the rubber product can maintain such good rubber properties for a long time that the rubber product is deformed by a small force corresponding to expansion and contraction of the skin to keep its moderate tightness, and it springs back to the original form the instance the force is removed. Therefore, the rubber product of the present invention exhibits desirable adhesion properties and sealing properties without causing poor blood circulation.

According to the rubber product of the present invention, since no allergenic ingredient is contained, the rubber product capable for avoiding such problems as inflammation is provided.

According to the rubber product of the present invention, the rubber product having a low modulus, low modulus ratios and low elongation set is easily provided.

What is claimed is:

1. A rubber product composed of synthetic isoprene rubber having 200% modulus $M_{200}$ of equal to or less than 15 kgf/cm$^2$ (14.7×10$^5$ Pa), wherein all modulus ratios of 200% modulus ($M_{200}$) to 100% modulus ($M_{100}$) $M_{200}/M_{100}$, 300% modulus ($M_{300}$) to 200% modulus ($M_{200}$) $M_{300}/M_{200}$, and 400% modulus ($M_{400}$) to 300% modulus ($M_{300}$) $M_{400}/M_{300}$ are equal to or less than 2.0.

2. A rubber product as claimed in claim 1, wherein 200% modulus U.l is equal to or less than 10 kgf/cm$^2$ (9.8×10$^5$ Pa).

3. A rubber product as claimed in claim 1, wherein all modulus ratios of 200% modulus ($M_{200}$) to 100% modulus ($M_{100}$), 300% modulus ($M_{300}$) to 200% modulus ($M_{200}$), and 400% modulus ($M_{400}$) to 300% modulus ($M_{300}$) are equal to or less than 1.5.

4. A rubber product as claimed in claim 1, wherein braking extension is equal to or more than 600%.

5. A rubber product as claimed in claim 4, wherein braking extension is equal to or more than 800%.

6. A rubber product as claimed in claim 1, wherein elongation set is equal to or less than 12%.

7. A rubber product as claimed in claim 1, wherein said synthetic isoprene rubber contains equal to or more than 90% cis-1,4 links.

8. A rubber product as claimed in claim 1, wherein said rubber product has a specific gravity of equal to or less than 1.06.

9. A rubber product as claimed in claim 8, wherein said specific gravity is equal to or less than 1.0.

10. A rubber product as claimed in claim 1, wherein said rubber product is not cracked even when said rubber product is held at extension of 20% for at least one month.

11. A rubber product as claimed in claim 1, wherein said rubber product contains an antioxidant of at least one of polyphenol and polyphenol/wax series.

12. A rubber product as claimed in claim 11, wherein said polyphenol is at least one of 2,2'-methylene-bis (4-ethyl-6-tert-butylphenol) and butylated product of dicyclopentadien and p-cresol.

* * * * *